US008830971B1

United States Patent
Shipley et al.

(10) Patent No.: US 8,830,971 B1
(45) Date of Patent: Sep. 9, 2014

(54) CONTROL OF MAXIMUM NUMBER OF CONCURRENT LOCAL DEVICE CONNECTIONS FOR A MOBILE HOTSPOT

(75) Inventors: Trevor D. Shipley, Olathe, KS (US); Cesar Perez, Olathe, KS (US); Joao C. Teixeira, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 230 days.

(21) Appl. No.: 13/191,152

(22) Filed: Jul. 26, 2011

(51) Int. Cl.
  *H04W 4/00* (2009.01)
  *H04W 84/12* (2009.01)
(52) U.S. Cl.
  CPC .................... *H04W 84/12* (2013.01)
  USPC ........................................................ 370/338
(58) Field of Classification Search
  CPC .................................................... H04W 84/12
  USPC ......... 370/229, 230, 235, 310, 315, 338, 400, 370/401
  See application file for complete search history.

(56) References Cited

U.S. PATENT DOCUMENTS

| | | | |
|---|---|---|---|
| 5,737,703 A | 4/1998 | Byrne | |
| 5,774,461 A | 6/1998 | Hyden et al. | |
| 5,898,679 A | 4/1999 | Brederveld et al. | |
| 5,907,540 A | 5/1999 | Hayashi | |
| 6,115,762 A | 9/2000 | Bell et al. | |
| 6,205,495 B1 | 3/2001 | Gilber et al. | |
| 6,292,747 B1 | 9/2001 | Amro et al. | |
| 6,327,254 B1 | 12/2001 | Chuah | |
| 6,330,244 B1 | 12/2001 | Swartz et al. | |
| 6,438,117 B1 | 8/2002 | Grilli et al. | |
| 6,680,923 B1 | 1/2004 | Leon | |
| 6,850,512 B1 | 2/2005 | Bishop et al. | |
| 7,193,987 B2 | 3/2007 | Vilander | |
| 7,376,091 B1 | 5/2008 | Eccles et al. | |
| 7,408,948 B2 | 8/2008 | Lopponen et al. | |
| 7,656,895 B2 * | 2/2010 | Burne et al. | 370/465 |
| 8,248,962 B2 * | 8/2012 | Zhao et al. | 370/252 |
| 8,249,550 B2 * | 8/2012 | Baggstrom et al. | 455/406 |
| 2001/0036830 A1 | 11/2001 | Wu et al. | |
| 2003/0091021 A1 | 5/2003 | Trossen et al. | |
| 2003/0156566 A1 | 8/2003 | Griswold et al. | |
| 2003/0171112 A1 | 9/2003 | Lupper et al. | |
| 2003/0202497 A1 | 10/2003 | Csapo | |
| 2004/0009751 A1 | 1/2004 | Michaelis et al. | |
| 2004/0185845 A1 | 9/2004 | Abhishek et al. | |
| 2004/0196978 A1 | 10/2004 | Godfrey et al. | |
| 2004/0236850 A1 | 11/2004 | Krumm et al. | |
| 2004/0264410 A1 | 12/2004 | Sagi et al. | |
| 2005/0085257 A1 | 4/2005 | Laird et al. | |
| 2006/0025077 A1 | 2/2006 | Haller et al. | |
| 2006/0056440 A1 | 3/2006 | Khartabil | |
| 2007/0091830 A1 | 4/2007 | Coulas et al. | |
| 2007/0111743 A1 | 5/2007 | Leigh et al. | |
| 2007/0249359 A1 | 10/2007 | Barbaresi | |

(Continued)

OTHER PUBLICATIONS

U.S. Appl. No. 11/393,058, filed Mar. 30, 2006.

(Continued)

*Primary Examiner* — Hassan Kizou
*Assistant Examiner* — Abdullahi Ahmed

(57) ABSTRACT

Disclosed is a mobile hotspot that includes multiple cellular radios and that is arranged to limit the number of concurrent local connections that it will support, based at least in part on which of its cellular radios is currently active.

20 Claims, 2 Drawing Sheets

(56) References Cited

U.S. PATENT DOCUMENTS

| | | | |
|---|---|---|---|
| 2007/0273922 A1* | 11/2007 | Matsugashita | 358/1.15 |
| 2008/0039102 A1* | 2/2008 | Sewall et al. | 455/445 |
| 2009/0054070 A1 | 2/2009 | Gallagher et al. | |
| 2011/0294502 A1* | 12/2011 | Oerton | 455/426.1 |
| 2012/0294310 A1* | 11/2012 | Yen et al. | 370/392 |

OTHER PUBLICATIONS

U.S. Appl. No. 11/455,602, filed Jun. 19, 2006.
J. Postel, "User Datagram Protocol," Internet Engineering Task Force, RFC: 768, Aug. 1980.
Information Sciences Institute, "Internet Protocol DARPA Internet Program Protocol Specification," Internet Engineering Task Force, RFC: 791, Sep. 1981.
Information Sciences Institute, "Transmission Control Protocol DARPA Internet Program Protocol Specification," Internet Engineering Task Force, RFC: 793, Sep. 1981.
C. Perkins, "IP Mobility Support," Internet Engineering Task Force, Network Working Group, Request for Comments: 2002, Oct. 1996.
C. Perkins, "IP Encapsulation within IP," Internet Engineering Task Force, Network Working Group, Request for Comments: 2003, Oct. 1996.
C. Perkins, "Minimal Encapsulation within IP," Internet Engineering Task Force, Network Working Group, Request for Comments: 2004, Oct. 1996.
J. Solomon, "Applicability Statement for IP Mobility Support," Internet Engineering Task Force, Network Working Group, Request for Comments: 2005, Oct. 1996.
P. Srisuresh et al., "Traditional IP Network Address Translator (Traditional NAT)," Network Working Group, Request for Comments: 3022, Jan. 2001.
E. Sutherland, "Insights: 802.11b and 3G Synergies for 2002," 802.11 Planet, http://www.80211-planet.com/columns/article/0,4000,1781_950811,00.html, printed Feb. 22, 2002.
"E-200 Cassipeia Pocket PC 2002," Casio, http://www.casio.com/personalpcs/product.cfm?section=19&product=4146, printed Feb. 22, 2002.
H. Choi, "Marking Notebooks Truly Mobile," techtv, http://www.techtv.com/freshgear/products/story/0,23008,3347281,00.html, printed Feb. 25, 2002.
"Product Description," WeRoam, http://www.weroam.com/, printed Feb. 25, 2002.
"Roaming Between WLAN and GSM Networks to Become Easier," thinkmobile, http://www.thinkmobile.com/Laptops/News/00/48/33/, printed Feb. 25, 2002.
E. Schonfeld, "The Island of the Wireless Guerrillas," Business 2.0, Apr. 2002 Issue, printed from http://www.business2.com.

\* cited by examiner

CONTROL OF MAXIMUM NUMBER OF CONCURRENT LOCAL DEVICE CONNECTIONS FOR A MOBILE HOTSPOT

BACKGROUND

Mobile hotspots are gaining widespread popularity. In general, a mobile hotspot is typically (but not necessarily) a portable device that interfaces between one form of wireless communication and another form of wireless communication, so that devices communicating with the hotspot using one form of wireless communication can gain access to network resources via the other form of wireless communication. In typical practice, for instance, a mobile hotspot will include a cellular wireless radio (e.g., a CDMA, GSM, WiMAX, LTE, or HSDPA radio) and a local wireless radio (e.g., an IEEE 802.11 WIFI or BLUETOOTH radio) and will be arranged to transmit wirelessly via each one of those radios the communications that it receives wirelessly via the other radio. Conveniently with this arrangement, a user device such as a portable computer or gaming system can obtain cellular network connectivity through local wireless communication with the hotspot, without a need for the user device itself to include a cellular radio.

OVERVIEW

The local radio of a mobile hotspot may function as a network access point for various local devices. As such, each local device may have a respective connection with the local radio and may engage in local wireless communications with the hotspot via that connection. This interaction between each local device and the hotspot may be a peer-to-peer arrangement or a client-server arrangement.

Further, the hotspot may be arranged to support multiple local connections concurrently, so that multiple local devices can use the hotspot at the same time, to gain cellular wireless connectivity. In particular, the local radio may establish multiple local connections, one with each local device, and may bridge the group of those connections together with a cellular connection.

By way of example, with packet data communication, each local device may have a Internet Protocol (IP) address in a local subnet and may use that address to communicate with the local radio of the hotspot, and the cellular radio may have an IP address and may use that address to communicate with a cellular radio access network (RAN). As the hotspot receives packets transmitted from the various local IP addresses, the hotspot may encapsulate and aggregate those packets into a packet stream from the hotspot's wide area IP address and transmit that packet stream to the cellular RAN. Likewise, as the hotspot receives packets transmitted to its wide area IP address from the cellular RAN, the hotspot may de-capsulate and transmit those packets to their ultimate destination local IP addresses.

A mobile hotspot can additionally be arranged to include multiple cellular radios and to selectively treat one or more of those radios as an active cellular radio at any given time. For example, a hotspot may include both CDMA and LTE cellular radios and a WIFI local radio, and the hotspot may be set to treat either the CDMA radio or the LTE radio as the active cellular radio at any given time. When the CDMA radio is deemed to be the active radio, the hotspot may bridge WIFI communications with CDMA communications via the CDMA radio. Whereas, when the LTE radio is deemed the active radio, the hotspot may bridge WIFI communications with LTE communications via the LTE radio.

Disclosed herein is a mobile hotspot that includes multiple cellular radios and that is arranged to limit the number of concurrent local connections that it will support, based at least in part on which of its cellular radios is currently active.

In one disclosed embodiment, for instance, a mobile hotspot includes a plurality of wide area network (WAN) radios (e.g., cellular radios), with each WAN radio being configured for wireless communication using a respective WAN air interface protocol that is different from each other WAN radio. Further, the hotspot includes a local radio that is configured for concurrent wireless communication with up to a maximum number of local devices using a local air interface protocol. And the hotspot includes a includes a switch (possibly integrated with one or more of radios) that operates to selective connect the local radio to an active WAN radio in the plurality of WAN radios, such that wireless communications received by the local radio are repeated using the active WAN radio and wireless communications received by the active WAN radio are repeated using the local radio. The hotspot then includes a controller (possibly integrated with the switch and/or one or more of the radios) that is configured to control the maximum number of local devices based, at least in part, on which WAN radio is the active WAN radio. For instance, the controller may change the maximum number in response to a change from one of the WAN radios being the active WAN radio to another of the WAN radios being the active WAN radio.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to illustrate the invention by way of example only.

DETAILED DESCRIPTION

Figure 1:
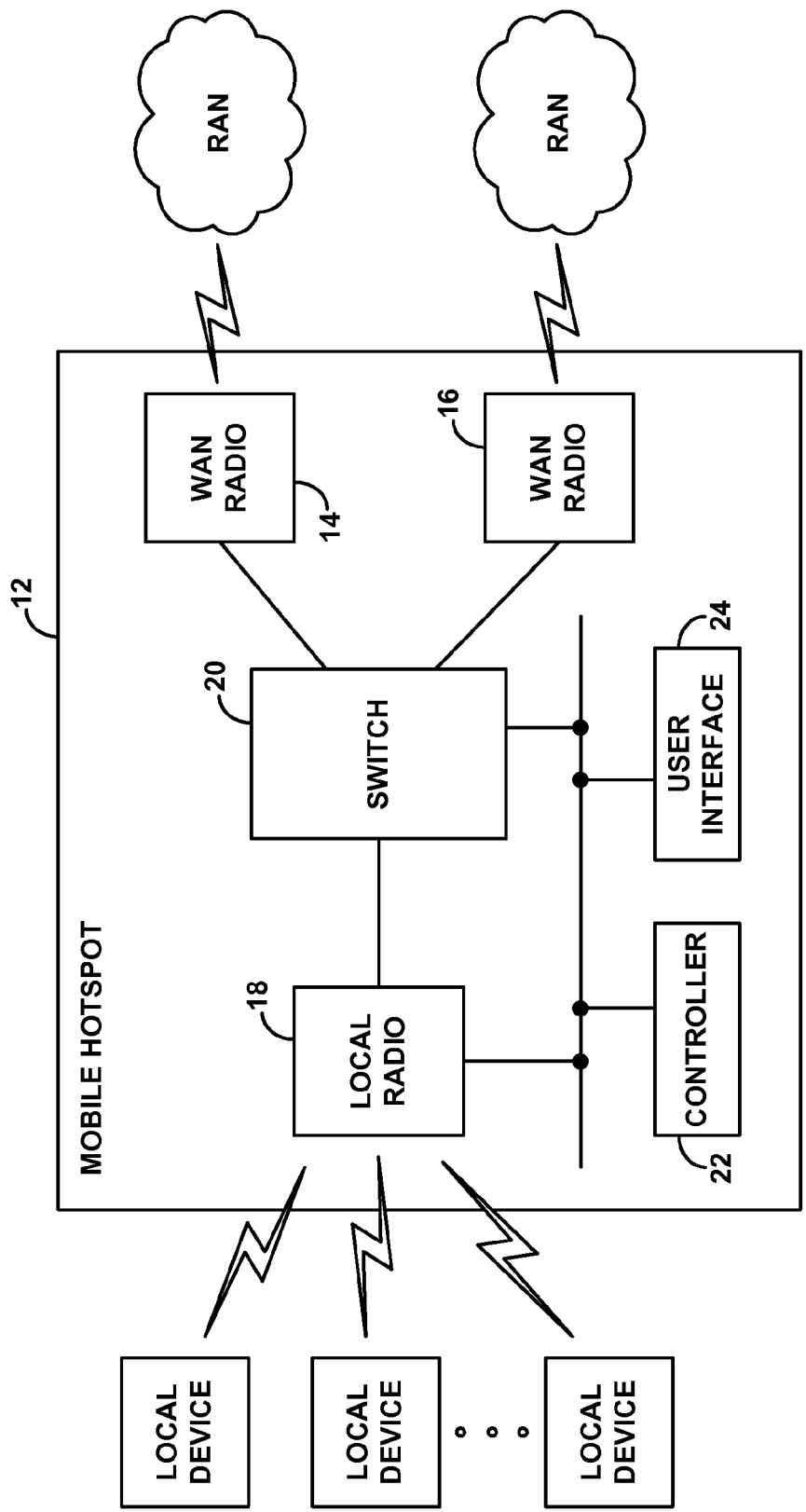
FIG. 1 is a simplified block diagram of a mobile hotspot showing functional components of such a device and showing its interrelationship with local devices and a wide area network.

Referring to the drawings, as noted above, FIG. 1 is a simplified block diagram depicting functional components of an example mobile hotspot 12. The hotspot can be provided as a discrete device or as a function of another device such as a handheld cell phone for instance.

As shown, the hotspot 12 includes a plurality of WAN radios including representative WAN radio 14 and representative WAN radio 16, and the hotspot includes a local radio 18. Each of these radios may be situated in the hotspot as a discrete module, such as a separate chipset for instance. Alternatively, some or all of these radios may be integrated together, such as by being provided together on a single chipset or other module for instance. Further, each radio or combination of radios may include a processing unit (not shown) that is arranged to carry out various radio functions described herein and may include or be connected with one or more antenna arrangements (not shown) to facilitate wireless communication.

Each of the WAN radios 14, 16 in this example arrangement engages in wireless communication using a respective WAN air interface protocol, and the air interface protocol used by each WAN radio differs from the air interface protocol used by each other WAN radio. (The device could of course be equipped with multiple WAN radios that use the same air interface protocol as each other. However, in the example implementation, the two representative WAN radios use different air interface protocols.) Examples of WAN air interface protocols include CDMA, GSM, WiMAX, LTE, and HSDPA and others now known or later developed.

The local radio 18, on the other hand, engages in wireless communication using a local air interface protocol. Examples of local air interface protocols include IEEE 802.11 (WIFI), BLUETOOTH and others now known or later developed. Alternatively, the local air interface protocol could be the same as one of the WAN air interface protocols used by one or more of the WAN radios. However, in the example arrangement, the local air interface protocol will be different than the WAN air interface protocols used by the WAN radios, so as to allow local devices to gain WAN connectivity by engaging in local wireless communication and without the need for the local devices to have or use a WAN radio.

Local radio 18 is configured for concurrent wireless communication with multiple local devices. For instance, local radio 18 may establish connections with each of multiple local devices and may support those connections concurrently. The local radio may establish these connections in accordance with its local air interface protocol and one or more other protocols, such as Dynamic Host Control Protocol (DHCP) for instance. By way of example, using 802.11, the local radio may broadcast an SSID, and local devices may each detect the SSID and engage in association signaling to establish an 802.11 link with the local radio. Further, the local radio may apply a DHCP function to assign network addresses such as IP addresses to each associated local device. Through this process, the local radio may thus establish connections with multiple local devices, and those connections may exist concurrently, so that the local radio can communicate with the multiple devices at substantially the same time. Further, various ones of these connections may be terminated (discontinued) by action of the hotspot or the connected local device.

It should be understood that "concurrent" wireless communication with multiple local devices can mean literally parallel and simultaneous communication or may mean interleaved communication. For instance, if the local radio is arranged to support parallel communication streams, such as a separate air interface traffic channel respectively with each connected local device, the local radio can engage in concurrent wireless communication with the local devices by communicating in parallel in those streams. Alternatively, the local radio could be arranged to interleave (e.g., time division multiplex) communications with multiple local devices so as to concurrently communicate with the local devices.

Local radio 18 is further configured to limit its number of concurrent local device connections to a designated maximum number. The maximum number may be specified by data stored in the local radio or elsewhere in the hotspot. To limit the number of local device connections to the maximum number, the local radio may keep count of the number of local devices currently connected with the local radio and, when another local device seeks a connection with the local radio, may automatically deny the connection request if the number of existing connections is already the maximum number.

As further shown in FIG. 1, the hotspot includes a switch 20 (i.e., any switch-like function, perhaps a gateway, router, or other logic) that functions to bridge together local radio communications with WAN radio communications. Although the switch is shown separately from the WAN radios and local radio, the switch could instead be integrated with the WAN radios and/or with the local radio, such as on a common chipset or other common module for instance.

Switch 20 will likely include a processing unit (not shown) arranged to carry out various switch functions described herein, by executing program instructions that are stored in or encoded on a non-transitory machine readable medium. Alternatively, switch 20 may be implemented as a specialized processor, such as an application specific integrated circuit to facilitate carrying out various described switch functions.

In the example arrangement, switch 20 is operatively interconnected (directly or indirectly) with each WAN radio and with the local radio. As shown conceptually in the figure, the switch may thus selectively connect the local radio 18 with a particular one of the WAN radios 14, 16 that is deemed to be an active WAN radio at any given time. Accordingly, if and when WAN radio 14 is the active WAN radio, the switch may operatively interconnect local radio 18 with WAN radio 14, so the hotspot will wirelessly transmit via WAN radio 14 communications that the hotspot wirelessly receives via local radio 18 and the hotspot will wirelessly transmit via local radio 18 communications that the hotspot wirelessly receives via WAN radio 14. And if and when WAN radio 16 is the active WAN radio, the switch may operatively interconnect local radio 18 with WAN radio 16, so that the hotspot will wirelessly transmit via WAN radio 16 communications that the hotspot wirelessly receives via local radio 18 and the hotspot will wirelessly transmit via local radio 18 communications that the hotspot wirelessly receives via WAN radio 16.

In an IP context, for instance, switch 20 may receive from local radio 18 a stream of IP packets carrying communications received wirelessly by the local radio from one or more local devices and may pass those or corresponding IP packets along to the active WAN radio for wireless transmission of the communications to a serving RAN. Likewise, switch 20 may receive from the active WAN radio a stream of IP packets carrying communications received wirelessly by the WAN radio from a serving RAN and may pass those or corresponding IP packets along to the local radio 18 for wireless transmission of the communications to one or more local devices.

In practice, as suggested above, the hotspot 12 may implement a network address translation (NAT) function to facilitate bridging of local communications in one subnet with WAN communications in another subnet. This NAT function can be implemented by the local radio, by the switch, by the active WAN radio, or by some other component of the hotspot.

To provide this function, each local device that has a connection with the local radio 18 may have an IP address (e.g., statically assigned or dynamically assigned) in a subnet used by the local radio and may use that IP address to exchange packets with the local radio. For WAN communications, however, the hotspot may have an IP address in a subnet used by a serving RAN or associated WAN infrastructure and the hotspot may thus use that IP address to exchange packets via the active WAN radio with the RAN.

Using standard NAT, when the local radio 18 receives a packet from a local IP address, the hotspot may encapsulate that packet in a header having as a source IP address the hotspot's WAN IP address and may then transmit the resulting packet via the active WAN radio. Further, the hotspot may include in the resulting packet a source port number that corresponds with the original source IP address of the local device. That way, when the hotspot's active WAN radio receives a packet destined to the hotspot's WAN IP address and a particular port number, the hotspot may translate that packet to one destined to the original local IP address and transmit the packet via local radio 18 to that local device.

Switch 20 may further manage which of the multiple WAN radios will be deemed the active WAN radio, so that the switch can then interconnect the local radio 18 with that active WAN radio. The switch may perform this management function based on logical interaction between the switch and the WAN radios and/or based on stored configuration settings possibly supplied by a user.

By way of example, the hotspot may include stored configuration data that specifies WAN radio 14 is preferred over WAN radio 16. In accordance with that data the hotspot may seek to acquire WAN connectivity via WAN radio 14, and, if successful as indicated perhaps by a signal from WAN radio 14 to switch 20, switch 20 may interconnect local radio 18 with WAN radio 14. On the other hand, if the hotspot is unsuccessful at acquiring WAN connectivity using WAN radio 14, the hotspot may instead seek to acquire WAN connectivity via WAN radio 16, and, if successful as indicated perhaps by a signal from WAN radio 16 to switch 20, switch 20 may interconnect local radio 18 with WAN radio 16.

Further, the transition from one WAN radio being the active WAN radio to another WAN radio being the active WAN radio may occur as the hotspot engages in a handoff from primarily using one WAN radio to primarily using the other WAN radio. In practice, for instance, if the hotspot is currently engaged in active WAN communication using one of its WAN radios (e.g., having an active cellular connection such as an assigned cellular air interface traffic channel according to the air interface protocol used by that WAN radio), the hotspot may engage in an active handoff to continue engaging in WAN communication using another of its WAN radios (e.g., having an active cellular connection such as an assigned cellular air interface traffic channel according to the different air interface protocol used by that other WAN radio). (Note that "active" in the sense of having an assigned wireless connection is different than "active" in the sense of which WAN radio is the one deemed to be currently used by the hotspot.) Alternatively, if the hotspot is currently in an idle WAN mode in which it does not have an active WAN connection but is using one of its WAN radios to monitor an associated cellular network, the hotspot may engage in an idle handoff to idle instead with another one of its WAN radios. These handoffs can occur as a result of changes in detected signal quality or for other reasons, and switch 20 may detect the handoff and determine the currently active WAN radio through communication with the WAN radios.

As further shown in FIG. 1, the hotspot 12 includes a controller 22. As with the other features of the hotspot, although the controller 22 is shown separately, it could alternatively be integrated with one or more of the other components. For instance, the controller could be integrated with the local radio 18, the switch 20, and/or one or more of the WAN radios, by being provided on a common chipset or other common module.

The controller 22 may include a processing unit (not shown), possibly that of the switch, arranged to carry out various controller functions described herein by executing program instructions that are stored in or encoded on a non-transitory machine readable medium. Alternatively, the controller may alternatively be implemented as a specialized processor, such as an application specific integrated circuit to facilitate carrying out the various described controller functions.

Controller 22 operates in the example arrangement to control the maximum number of local devices with which local radio 18 is configured to concurrently communicate, i.e., the limit of how many local devices can concurrently connect with local radio 18. In particular, the controller 22 sets and/or changes the maximum number based at least in part on which WAN radio is currently the active WAN radio. For instance, the controller may set the maximum number to one value when WAN radio 14 is the active WAN radio but to a different value when WAN radio 16 is the active WAN radio. Further, when the hotspot changes from using one WAN radio as the active WAN radio to using another WAN radio as the active WAN radio, controller 22 may respond to that change by accordingly changing the maximum number of allowed concurrent local devices.

In an example implementation, controller 22 may communicate via a system bus or other mechanism with switch 20 and/or with other hotspot components in order to determine which WAN radio is currently the active WAN radio and may set the maximum number accordingly. For instance, the switch may be arranged to signal to the controller 22 to indicate the currently active WAN radio, and so the controller may determine the currently active WAN radio by receiving and reading that signal from the switch. Alternatively, the switch may be arranged to publish (e.g., store to a commonly accessible data storage location) an indication of which WAN radio is currently active, and the controller may be arranged to read that published indication to determine which WAN radio is currently active.

The controller 22 may further include or have access to data storage or logic that stores or otherwise defines a mapping between WAN radios and maximum numbers of concurrent local devices. This mapping can be defined permanently in the hotspot at the time the hotspot is manufactured, or it could be defined in some other manner, such as through configuration by a distributor or end-user. In the arrangement of FIG. 1, the mapping may specify a particular maximum number to use when WAN radio 14 is active and a different maximum number to use when WAN radio 16 is active. When the controller 22 determines which WAN radio is currently active, the controller may thus use that mapping to determine what the maximum number should be, and the controller may then responsively set the maximum number to the determined value.

The mapping between WAN radios and maximum numbers can be defined per WAN radio by correlating an identifier of each WAN radio with a respective maximum number, such that each WAN radio is correlated with a different maximum number. For instance, the mapping might specify a particular maximum number for WAN radio 14 and a different maximum number for WAN radio 16. Alternatively, considering that the WAN radios will likely use different WAN air interface protocols, the mapping can be defined per WAN radio by correlating each WAN air interface protocol with a respective maximum number. For instance, if WAN radio 14 uses CDMA communication and WAN radio 16 uses LTE communication, the mapping might specify a particular maximum number for CDMA communication (and thus for WAN radio 14) and a different maximum number for LTE communication (and thus for WAN radio 16). In practice, controller 22 may receive from switch 20 an indication of the currently active WAN radio and/or the currently active WAN air interface protocol, to facilitate mapping to a respective maximum number. Other mapping arrangements are possible as well.

Further, while controller 22 will set the maximum number based on which WAN radio is currently active, controller 22 may additionally take into account other factors, such as time of day, battery power, or the like, in setting the maximum number. In any event, though, the selection of maximum value will be based at least on which WAN radio is currently active.

In practice, the controller may set the maximum number in a manner that allows local radio 18 to determine and apply the maximum number, so that local radio 18 can limit the number of concurrent connections it will support. By way of example, the controller may signal to the local radio 18 via a system bus or other mechanism to inform the local radio 18 of the maximum number. Alternatively, the controller may publish the maximum number (e.g., storing the maximum number to a commonly accessible data storage location), and local radio 18 may refer to that published maximum number. Still alternatively, controller 22 may maintain the maximum number and, when necessary, local radio 18 may query the controller to determine what the maximum number is.

Thus, when controller 22 determines that a particular one of the WAN radios is the active WAN radio, controller 22 may responsively set the maximum number to a value corresponding to that WAN radio, and local radio 18 may then limit the number of its concurrent local device connections to that maximum number. In turn, when controller 22 determines that another WAN radio has become the active WAN radio, the controller may responsively change the maximum number to a value corresponding to that other WAN radio, and the local radio 18 may then limit the number of its concurrent local device connection to that newly designated maximum number.

Through this process, there may be instances when the maximum number is thereby reduced to a value that is less than the current number of local device connections. When that happens, the local radio may be arranged to continue supporting its current local device connections but as a sufficient number of those connections terminate, the local radio may then impose the new maximum number restriction.

As yet further shown in FIG. 1, the hotspot 12 may include a user interface 24. This user interface may comprise a graphical display and/or other visible mechanism that can function to indicate the state of operation of the hotspot, such as to indicate which of the WAN radios is currently active and to indicate the current maximum number limit on number of allowed local device connections, and perhaps an indication of how many local device connections currently exist. Conveniently, the user interface may therefore allow a user to readily determine the state of the hotspot.

Further, the user interface may be structured with buttons or other mechanisms to receive user input defining a signal that directs use of a particular WAN radio and that thereby causes switch 20 to responsively make the particular WAN radio the active WAN radio and thus to interconnect local radio 18 with that WAN radio. In practice, for instance, input through such a mechanism may cause representative data to be provided to controller 22 and in turn to switch 20, or directly to switch 20, and switch 20 may then set the designated WAN radio as the active WAN radio. In accordance with the present method, if this results in a change in active WAN radio, the change would then effect a change in the maximum number of allowed local device connections as discussed above.

Figure 2:
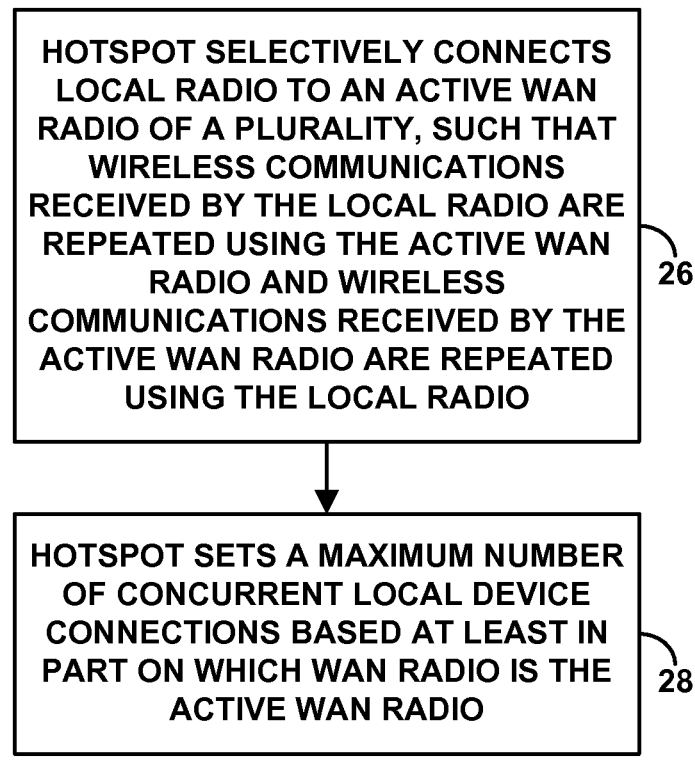
FIG. 2 is a flow chart depicting functions that can be carried out by a mobile hotspot in accordance with the present disclosure.

FIG. 2 is next a flow chart depicting functions that can be implemented in accordance with the present method. This method is operable by a mobile hotspot that has (i) multiple WAN radios each configured for wireless communication using a respective WAN air interface protocol that is different from each other WAN radio and (ii) a local radio that is configured for concurrent wireless communication with up to a maximum number of local devices using a local air interface protocol. As shown in FIG. 2, at block 26, the method involves the hotspot selectively connecting the local radio to an active WAN radio in the plurality of WAN radios, such that wireless communications received by the local radio are repeated using the active WAN radio and wireless communications received by the active WAN radio are repeated using the local radio. Further, at block 28, the method involves the hotspot setting the maximum number based, at least in part, on which WAN radio is the active WAN radio.

An exemplary embodiment has been described above. It should be understood, however, that variations from the embodiment discussed are possible, while remaining within the true spirit and scope of the invention as claimed. For example, although the foregoing description is focused on "local" and "WAN" radios and corresponding air interface communication, the disclosed concepts can readily apply as well with respect to other types of radios supporting other types of air interface communication. As another example, although the foregoing description describes the hotspot as including a single local radio, the disclosed concepts can readily apply to a hotspot that includes multiple local radios, such as by imposing the maximum number restriction in total across the local radios. Numerous other examples are possible as well.

We claim:

1. A mobile hotspot, comprising:
a plurality of wide area network (WAN) radios, wherein each WAN radio is configured for wireless communication using a respective WAN air interface protocol that is different from each other WAN radio;
a local radio, wherein the local radio is configured for concurrent wireless communication with up to a maximum number of local devices using a local air interface protocol;
a switch for selectively connecting the local radio to an active WAN radio in the plurality of WAN radios, such that wireless communications received by the local radio are repeated using the active WAN radio and wireless communications received by the active WAN radio are repeated using the local radio; and
a controller, wherein the controller is configured to control the maximum number based, at least in part, on which WAN radio is the active WAN radio, wherein the controller sets the maximum number to a first maximum number when a first one of the WAN radios is the active WAN radio and the controller sets the maximum number to a second, different maximum number when a second one of the WAN radios is the active WAN radio.

2. The mobile hotspot of claim 1, wherein the WAN radios are cellular radios, and the local radio is an 802.11 radio.

3. The mobile hotspot of claim 1, wherein the controller is integrated with the local radio.

4. The mobile hotspot of claim 1, wherein the switch is integrated with the WAN radios.

5. The mobile hotspot of claim 1, wherein the controller is arranged to change the maximum number in response to a change from one of the WAN radios being the active WAN radio to another of the WAN radios being the active WAN radio.

6. The mobile hotspot of claim 1, wherein the controller comprises a processor programmed with instructions to control the maximum number based, at least in part, on which WAN radio is the active WAN radio.

7. The mobile hotspot of claim 1, further comprising a user interface, wherein the switch selects the active WAN radio responsive to receipt of a signal designating the active WAN radio, wherein the signal corresponds with input received via the user interface, the input defining a selection of the active WAN radio.

8. The mobile hotspot of claim 1, further comprising a user interface, wherein the user interface displays an indication of the maximum number.

9. The mobile hotspot of claim 1, wherein the controller controls the maximum number based on which WAN radio is the active WAN radio by setting the maximum number based on a WAN air interface protocol of the active WAN radio.

10. A method operable by a mobile hotspot, the mobile hotspot having (i) a plurality of wide area network (WAN) radios, wherein each WAN radio is configured for wireless communication using a respective WAN air interface protocol that is different from each other WAN radio and (ii) a local radio, wherein the local radio is configured for concurrent wireless communication with up to a maximum number of local devices using a local air interface protocol, the method comprising:
  the hotspot selectively connecting the local radio to an active WAN radio in the plurality of WAN radios, such that wireless communications received by the local radio are repeated using the active WAN radio and wireless communications received by the active WAN radio are repeated using the local radio; and
  the hotspot setting the maximum number based, at least in part, on which WAN radio is the active WAN radio, wherein the hotspot sets the maximum number to a first maximum number if a first one of the WAN radios is the active WAN radio, but the hotspot sets the maximum number to a second, different maximum number if a second one of the WAN radios is the active WAN radio.

11. The method of claim 10, wherein the WAN radios are cellular radios, and the local radio is an 802.11 radio.

12. The method of claim 10, further comprising:
  the hotspot switching from the first one of the WAN radios being the active WAN radio to the second one of the WAN radios being the active WAN radio; and
  responsive to the switching, the hotspot changing the maximum number.

13. The method of claim 12, wherein changing the maximum number responsive to the switching comprises one of increasing the maximum number and decreasing the maximum number.

14. The method of claim 13, wherein decreasing the maximum number comprises reducing the maximum number from a first number to a second number lower than the first number, and wherein decreasing further comprises:
  if the local radio is already concurrently communicating with a number of local devices that is higher than the second number, then (i) waiting for the number of local devices with which the local radio is concurrently communicating to be at least as low as the second number and then (ii) applying the second number as a maximum limit of the number of local devices with which the local radio will concurrently communicate.

15. The method of claim 12, wherein switching from the first WAN radio being the active WAN radio to the second WAN radio being the active WAN radio comprises engaging in an idle handoff from use of the first WAN radio to use of the second WAN radio.

16. The method of claim 12, wherein switching from the first WAN radio being the active WAN radio to the second WAN radio being the active WAN radio comprises engaging in an active handoff from use of the first WAN radio to use of the second WAN radio.

17. The method of claim 12, wherein the mobile hotspot further comprises a user-interface, and wherein switching from the first WAN radio being the active WAN radio to the second WAN radio being the active WAN radio comprises receiving via the user interface input directing use of the second WAN radio, and performing the switching in response to the input.

18. The method of claim 10, wherein the mobile hotspot further comprises a user-interface, the method further comprising:
  the user interface presenting an indication of the maximum number.

19. The method of claim 10, wherein the mobile hotspot further comprises a processor, and wherein setting the maximum number based, at least in part, on which WAN radio is the active WAN radio comprises the processor executing instructions to set the maximum number.

20. A mobile hotspot, comprising:
  a plurality of cellular radios, wherein each cellular radio is configured for wireless communication using a respective cellular air interface protocol that is different from each other cellular radio;
  an 802.11 radio, wherein the 802.11 radio is configured for concurrent wireless communication with up to a maximum number of local devices using an 802.11 air interface protocol;
  a switch for selectively connecting the 802.11 radio to an active cellular radio in the plurality of cellular radios, such that wireless communications received by the 802.11 radio are repeated using the active cellular radio and wireless communications received by the active cellular radio are repeated using the 802.11 radio;
  a controller configured to change the maximum number of local devices in response to the switch transitioning from using a first one of the cellular radios as the active cellular radio to using a second one of the cellular radios being the active cellular radio; and
  a user interface for displaying an indication of the maximum number.

* * * * *